United States Patent

McKown

[15] 3,696,447
[45] Oct. 10, 1972

[54] LEAK SEALING DEVICE

[72] Inventor: Ernest M. McKown, 1313 Acredale Road, Virginia Beach, Va. 23462

[22] Filed: April 2, 1970

[21] Appl. No.: 25,089

[52] U.S. Cl. .......................................4/1, 4/57, 4/67, 138/97, 285/15
[51] Int. Cl. ......F16l 15/06, F16l 15/10, A47k 17/00
[58] Field of Search ..........4/57, 67, 1; 277/108, 110, 277/112; 138/97, 89, 98, 94.3, 90; 285/15

[56] References Cited

UNITED STATES PATENTS

| | | | |
|---|---|---|---|
| 1,471,184 | 10/1923 | Miles | 138/98 X |
| 714,671 | 12/1902 | Clark | 138/98 |
| 249,783 | 11/1881 | Morgan | 138/98 |
| 268,571 | 12/1882 | Thompson | 138/98 |

FOREIGN PATENTS OR APPLICATIONS

| | | | |
|---|---|---|---|
| 2,126 | 11/1876 | Great Britain | 138/89 |
| 14,727 | 2/1905 | Norway | 138/98 |

*Primary Examiner*—Henry K. Artis
*Attorney*—John X. Phillips

[57] ABSTRACT

For use particularly in sealing a leak adjacent the lower end of a toilet tank overflow pipe, a tube is inserted into the top of the overflow pipe and carries a deformable packing adjacent its lower end, and a nut threaded on the tube is adapted to be turned downwardly by a tubular tool to deform the packing to seal the leak, whereupon the tubular tool is removed.

7 Claims, 6 Drawing Figures

PATENTED OCT 10 1972 3,696,447
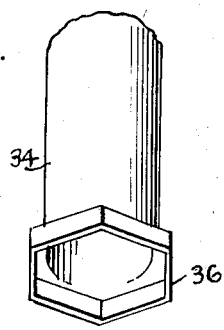
FIG. 4.
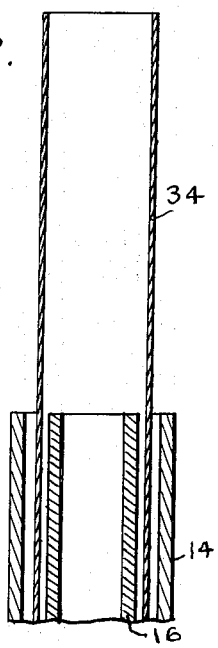
FIG. 2.
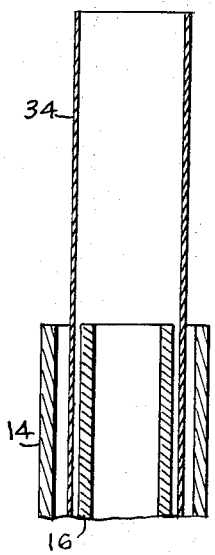
FIG. 3.
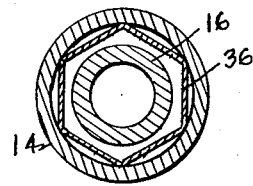
FIG. 5.
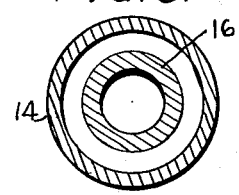
FIG. 6.
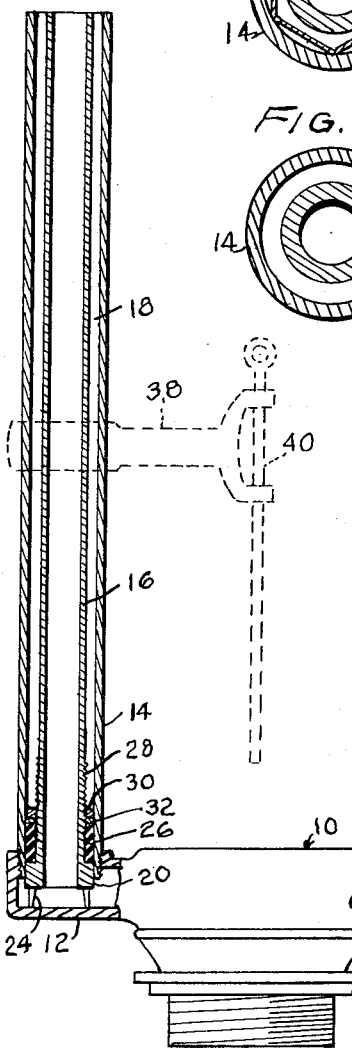
FIG. 1.
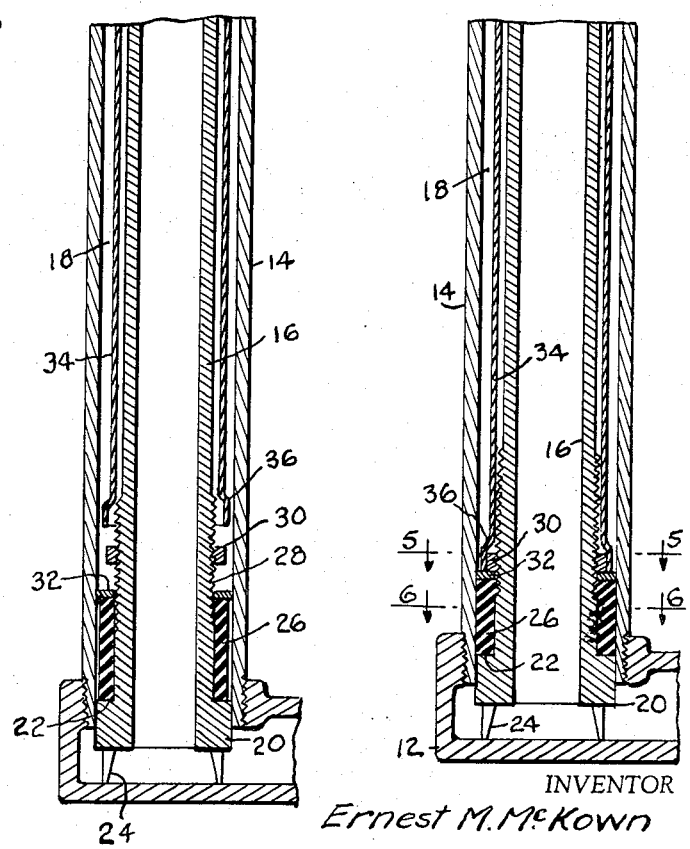
INVENTOR
Ernest M. McKown
BY John F. Phillips
ATTORNEY

LEAK SEALING DEVICE

BACKGROUND OF THE INVENTION

Conventional toilet tanks are provided in the bottom thereof with a flush valve and seat, the latter of which projects through the bottom of the tank and is provided with a hollow radial extension into which the lower end of an overflow pipe is fitted so that if the conventional inlet valve leaks or fails to close, the excess water flows downwardly through the overflow pipe and into the flush valve seat. Adjacent the point of connection of the lower end of the overflow pipe with the radial extension of the flush valve seat, corrosion often causes leaks to occur, permitting water in the tank to flow into the flush valve seat.

SUMMARY OF THE INVENTION

The present device comprises a tube having a lower end insertable into the upper end of the overflow pipe and provided at its lower end with feet engaging the bottom wall of the radial extension of the flush valve seat to limit downward movement of the tube when inserted into position so that the interior of the tube is in full communication with the interior of the flush valve seat. Above such feet the tube is provided with an annular shoulder above and in engagement with which is arranged a rubber or other cylindrical deformable packing. Above the packing, the tube is threaded and carries a polygonal nut. After the device is inserted into the overflow pipe in the manner stated, a tubular tool having a polygonal socket at its lower end is inserted downwardly through the annular space between the inserted tube and the overflow pipe. The polygonal wrench fits the nut on the tube, and the tool is rotated through the projecting upper end thereof, thus rotating the nut to turn it downwardly and deform the packing into tight engagement with the tube and with the overflow pipe to seal the leak in the latter. The tubular tool is then removed and the sealing of the leak is completed.

BRIEF DESCRIPTION OF THE DRAWING

FIG. 1 is a vertical sectional view through the device in operation, a portion of the flush valve seat being shown in elevation;

FIG. 2 is an enlarged vertical section showing the normal positions of the parts with the tubular wrench about to be brought into operation;

FIG. 3 is a similar view showing the positions of the parts after the packing has been deformed;

FIG. 4 is a fragmentary perspective of the lower end of the tubular tool;

FIG. 5 is a section on line 5—5 of FIG. 3; and

FIG. 6 is a similar view on line 6—6 of FIG. 3.

DESCRIPTION OF THE PREFERRED EMBODIMENT

Referring to FIG. 1, the numeral 10 designates a conventional flush valve seat through which water flows to flush a toilet when the flush valve (not shown) is lifted. The seat 10 is provided with a hollow radial extension 12 into the top of which is threaded or otherwise connected a conventional overflow pipe 14 open at its upper end for the flow therethrough of water into the valve seat 10 if the inlet valve of the tank leaks or fails to close. It is adjacent the top of the radial extension 12 that corrosion frequently causes the overflow pipe to leak, and in which case water will flow from the toilet tank into the radial extension 12 and thus downwardly through the seat 10. This results, of course, in the emptying of the tank.

The present device comprises a tube 16 of smaller diameter than the overflow pipe 14 to provide therebetween an annular space 18 for a purpose to be described. Adjacent its lower end, the tube 16 is provided with an annular flange 20 providing at the top thereof a shoulder 22 for a purpose to be described. The flange 20 is slideable through the overflow pipe 14 and is provided therebelow with feet 24 adapted to engage the bottom of the radial extension 12 to limit downward movement of the tube 16 to maintain full communication between the lower end of such tube and the flush valve seat 10.

A deformable cylindrical packing element 26 surrounds the lower end portion of the tube 16 and seats on the shoulder 22. This packing is of slightly smaller diameter than the internal diameter of the overflow pipe 14 to permit the assembly of the tube 16 to be easily inserted into the position shown in FIG. 2.

The lower end portion of the tube 16 is externally threaded as at 28 and extends through a nut 30. A washer 32 may be arranged in contact with the top of the packing 26, if desired. It will be apparent that if the nut 30 is turned downwardly, it will engage the washer 32 and deform the packing 26.

Downwardly through the top of the annular space 18 is insertable a tubular wrench 34, the lower end of which has formed thereon a polygonal wrench socket 36 corresponding in shape and size to the nut 30 to engage the latter.

The overflow pipe is provided with the usual arm 38 slideably supporting a vertically movable stem 40 conventionally connected at its lower end to a flush valve associated with the seat 10. Such valve and the operating means therefor are old and well known and obviously form no part of the present invention.

OPERATION

Assuming that a leak occurs in the overflow pipe 14 at the point referred to, a plumber will insert the tube 16 of the present device downwardly through the open top of the overflow pipe to the position shown in FIG. 2. At this time, the packing 26 will be of normal shape and the nut 30 will be arranged above the washer 32, if such element is used. Having thus placed the tube 16 in position, the tubular wrench 34 is then moved downwardly through the annular space 18 to engage the wrench 36 with the nut 30. By any suitable means, such as large pliers or a wrench, the upper end of the tubular tool is rotated to move the nut downwardly from the position shown in FIG. 2 into engagement with the washer 32. Continued operation of the wrench will cause the nut 30 to move the washer 32 downwardly and this action deforms the packing 26 vertically and radially to the shape shown in FIG. 3, the packing fitting tightly against all of the elements with which it contacts, including the overflow pipe 14, and the packing effectively seals the leak. The tool 34 is then removed and the operation is completed.

It will be apparent that the present device may be inserted and its operation completed in a matter of a minute or two. The operation is very easily performed as compared with the necessity for removing and replacing the overflow pipe 14. If the tank should overflow, some of the water will flow into the annular space 18 and be trapped, but this makes no difference in the operation of the device since overflow water can readily flow downwardly through the tube 16 to be discharged through the flush valve seat 10. The use of the washer 32 is not necessary since the packing can be deformed by the nut 30, but the use of the washer is preferred to prevent the nut 30 from "chewing" into the top of the packing 26.

I claim:

1. A device for sealing a leak adjacent the lower end of an open topped pipe comprising a tube insertable downwardly into the upper end of such pipe and having an external annular flange at its lower end, a deformable packing carried by said tube to be positioned on said flange adjacent the leak when the tube is inserted in the pipe, a nut threaded on said tube above and adjacent said flange, and a tool insertable through and removable from the open end of said pipe around said tube for rotating said nut downwardly to effect the deforming of said packing.

2. A device according to claim 1 wherein said tube is of smaller diameter than the internal diameter of the pipe, said tool being tubular and insertable in the space between said pipe and said tube, said tool having a polygonal socket at its lower end engageable with said nut.

3. A device according to claim 2 provided with a washer engaging the upper end of said packing and against which said nut is rotatable upon operation of said tool to deform said packing.

4. In combination with a flush valve seat of a toilet tank having a hollow radial extension and an overflow pipe fixed at its lower end in the top of said extension, a tube insertable into the upper end of said overflow pipe and limited in its downward movement to maintain communication between the lower end of said tube and said extension, an annular shoulder formed on said tube at the lower end thereof and having its upper limit position below the top of said extension, an annular deformable packing element surrounding said tube and engaging at its lower end with said shoulder, and means for exerting a downward force against the upper end of said packing to deform it into tight engagement with the inner surface of said overflow pipe to seal a leak therethrough adjacent the top of said extension.

5. The combination defined in claim 4 wherein said tube is slideable through said overflow pipe, and means for limiting downward movement of said tube to maintain communication between the lower end of said tube and said extension.

6. The combination defined in claim 4 wherein said means for exerting a downward force on said packing comprises a nut threaded on said tube.

7. The combination defined in claim 6 wherein said tube is of smaller diameter than the interior of said overflow pipe to provide an annular space therebetween, and a tubular tool insertable downwardly through said annular space and having a polygonal socket formed in its lower end to engage said nut whereby rotation of said tube will move said nut downwardly to exert said force against said packing to deform it.

* * * * *